March 23, 1971  G. J. LUKAS ET AL  3,572,120
LIQUID LEVEL GAUGE
Filed June 12, 1969
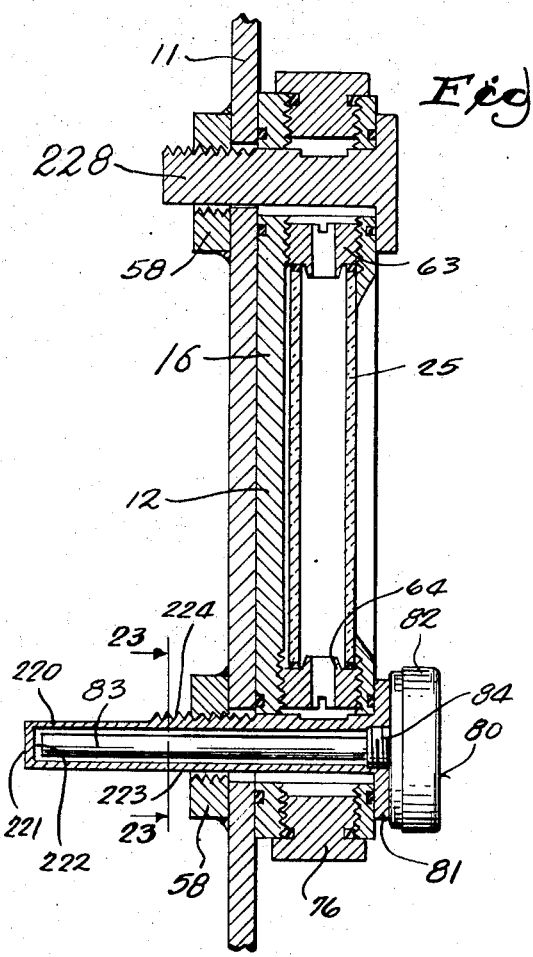
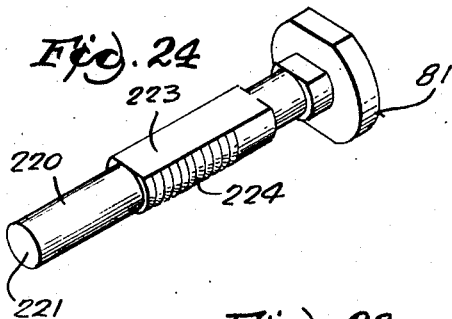
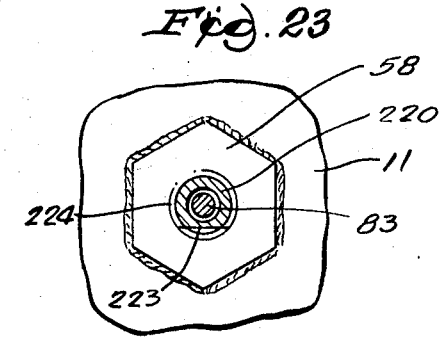
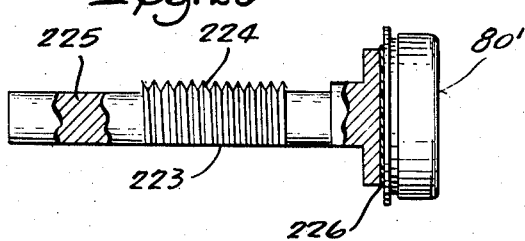
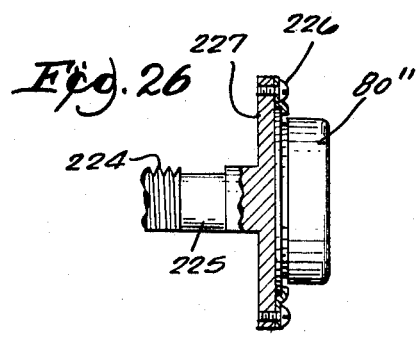
INVENTORS
GUS J. LUKAS
FLOYD J. BYDALEK
BY Wheeler, Wheeler, House & Clemency
ATTORNEYS United States Patent Office 3,572,120
Patented Mar. 23, 1971

3,572,120
LIQUID LEVEL GAUGE
Gus J. Lukas and Floyd J. Bydalek, Manitowoc, Wis., assignors to Lube Devices, Inc., Manitowoc, Wis.
Continuation-in-part of applications Ser. No. 407,710, Oct. 30, 1964, now abandoned, and Ser. No. 670,696, Sept. 26, 1967, now Patent No. 3,455,163, dated July 15, 1969. This application June 12, 1969, Ser. No. 832,707
Int. Cl. G01f 23/02
U.S. Cl. 73—292                             8 Claims

ABSTRACT OF THE DISCLOSURE

A combination liquid level gauge and dial thermometer adapted to be mounted upon a tank in which the dial thermometer is visible from the front of the gauge but has a sensor which is in heat transmitting relation to the liquid.

CROSS REFERENCE TO RELATED APPLICATIONS

This application is a continuation-in-part of our copending United States patent application Ser. No. 670,696, filed Sept. 26, 1967, now U.S. Pat. 3,455,163, granted July 15, 1969, and also of our previous United States patent application Ser. No. 407,710, filed Oct. 30, 1964, now abandoned, and which was copending with said United States application Ser. No. 670,696.

SUMMARY OF THE INVENTION

In one aspect, the present invention relates to a combination of liquid level gauge and dial thermometer for measuring the level and temperature of liquid in a tank, said gauge comprising a body made of transparent material and having an internal cavity providing a sight, a dial thermometer mounted on said body and having a sensor in heat transmitting relation to the liquid, and upper and lower mounting fasteners connected to said body and by which the body is mounted on the tank, said fasteners having passages to admit liquid into said cavity.

Another aspect of the invention relates to the form of the fastener by which a gauge is mounted on the tank, said fastener having a relieved external portion which forms a passage opening between the gauge cavity and the tank.

DESCRIPTION OF DRAWINGS

FIG. 22 is a vertical cross section through a liquid level gauge embodying the invention.

FIG. 23 is a cross section along the line 23—23 of FIG. 22.

FIG. 24 is a perspective view of the mounting bolt of FIG. 22.

FIG. 25 is a cross section, partly in elevation, through a modified mounting bolt.

FIG. 26 is a cross section through a further modification.

DESCRIPTION OF PREFERRED EMBODIMENTS

Although the disclosure hereof is detailed and exact to enable those skilled in the art to practice the invention, the physical embodiments herein disclosed merely exemplify the invention which may be embodied in other specific structure.

The entire disclosure of said copending U.S. Pat. 3,455,163 is incorporated herein by reference. FIGS. 1–21, inclusive, are illustrated and described in said copending patent. With respect to some of the claimed subject matter hereof, attention is invited particularly to FIGS. 10, 11, and 12 of the said copending patent and to the description relating thereto. In the exemplification of FIGS. 10, 11 and 12, the rear edges of flanges 121 define a back portion of the vertically elongated gauge body or shell which is disposed in confronting proximate relation to the tank wall 122, throughout the vertical elongation of the body or shell.

Newly disclosed subject matter of this application appears in FIGS. 22–26, inclusive.

Parts in FIGS. 22 through 26 which correspond to like parts shown in FIGS. 1 through 21 are given the same reference characters.

In the embodiment of FIG. 22, the gauge body 12 is fastened to the tank wall 11 in a manner generally similar to that shown in FIG. 5. The back wall 16 of the vertically elongated body is disposed in confronting proximate relation to the tank wall 11 throughout the vertical elongation of the body. However, the mounting bolt 220 is not open at its rear end, as shown in FIG. 5, but has a closed end wall 221, thus to enclose the hollow interior of the bolt as a sensor well 222 within which the sensing stem 83 of the dial face thermometer 80 is fully enclosed. Accordingly, the thermometer 80 with its sensing stem 83 can be removed from the gauge without loss of liquid. Moreover, the stem 83 is positively protected against damage throughout its length.

Moreover, the side of bolt 220 is relieved or flattened at 223 by interrupting the threads 224, thus to provide an external side passage through which liquid can flow into the cavity of the sight glass 25 from the tank 11. This gives the fastener a D-shaped cross section. Accordingly, in this embodiment, the liquid does not flow through the interior of the mounting bolt 220, but flows along its outside, and specifically along the relieved external portion 223 thereof.

FIG. 25 shows a further modification in which the bolt 225 is solid, as distinguished from having an internal passage or well. In this embodiment, the threads 224 are also interrupted at 223 to form an external flat or passage through which liquid flows between the tank and the sight glass cavity. In this embodiment the dial face thermometer 80' has a sensor incorporated at the rear of the dial face housing and is in heat transmitting communication with the solid bolt 225 through an adhesive layer 226. FIG. 6 shows another modification in which the dial face thermometer 80" is connected by a peripheral series of bolts 226 to a flange 227 on the solid bolt 225.

The various fasteners 220, 225, shown in FIGS. 22–26, may be substituted for the various fasteners as shown in the other embodiments of the invention.

At its top gauge body 12 is fastened by a bolt 228 which is similar to bolt 225 of FIG. 25. The relieved external portion of the bolt threads provides a passage between the interior of the tank 11 and the hollow interior of the gauge.

We claim:

1. A combination liquid level gauge and a dial thermometer for measuring the level and temperature of liquid in a tank, said gauge comprising a vertically elongated hollow cavity shell made of transparent material, said shell constituting in one piece both a gauge body and a sight, said shell having a back portion which is disposed in confronting proximate relation to the tank throughout the vertical elongation of the shell, a dial thermometer mounted on said shell and having a sensor in heat transmitting relation to the liquid, upper and lower fasteners connected to said shell and by which the shell is mounted on the tank, said fasteners each extending through the back portion of the shell and each having a passage between the tank and said hollow cavity.

2. The invention of claim 1 in which at least one of said fasteners is hollow with its passage formed internally therewithin.

3. The invention of claim 1 in which at least one of said fasteners has a relieved external portion to form said passage.

4. A combination liquid level gauge and dial thermometer for measuring the level and temperature of liquid in a tank, said gauge comprising:
- a gauge body having a cavity and a transparent sight through which liquid level in the cavity is visible,
- a dial thermometer mounted on the body and having a sensor at the rear thereof,
- a threaded fastener for attaching the body to the tank,
- said fastener having a relieved external portion through its threads forming a liquid flow passage opening into said cavity and into said tank.

5. The invention of claim 4 in which the fastener comprises a sensor well.

6. The invention of claim 4 in which the fastener comprises a solid bolt.

7. A combination liquid level gauge and dial thermometer for measuring the level and temperature of liquid in a tank, said gauge comprising:
- a vertically elongated gauge body having a cavity and a transparent sight through which liquid level in the cavity is visible,
- said body having a back portion which is disposed in confronting proximate relation to the tank throughout the vertical elongation of the body,
- a dial thermometer having a dial face housing and a sensor at the rear thereof,
- upper and lower fasteners for attaching the body to the tank,
- each said fastener extending through the back portion of the body and each said fastener having a passage opening into said cavity and into said tank,
- said body and sight integrally comprising a one-piece shell of transparent material.

8. A combination liquid level gauge and dial thermometer for measuring the level and temperature of liquid in a tank, said gauge comprising:
- a vertically elongated gauge body having a cavity and a transparent sight through which liquid level in the cavity is visible,
- a dial thermometer mounted on the body and having a sensor stem extending rearwardly therefrom,
- said body having a front wall and a back wall and upper and lower holes through at least its back wall,
- said back wall being disposed in confronting proximate relation to the tank throughout the vertical elongation of the body,
- upper and lower fasteners fabricated separately from the body and extending into said holes for attaching the body to the tank, said lower fastener having a well in which said sensor stem is enclosed,
- said lower fastener having a passage outside said well through which liquid can flow between the tank and gauge cavity.

References Cited
UNITED STATES PATENTS

| | | | |
|---|---|---|---|
| 1,168,518 | 1/1916 | Lewis | 73—292 |
| 1,201,128 | 10/1916 | Wirth | 73—332 |
| 1,210,385 | 12/1916 | Hunziker | 73—323 |
| 1,275,935 | 8/1918 | Jones | 73—323 |
| 1,279,187 | 9/1918 | Walker | 73—292 |
| 1,912,672 | 6/1933 | Vissering | 73—292X |
| 2,603,091 | 7/1952 | Lamb | 73—343 |
| 2,985,017 | 5/1961 | Schutt | 73—343 |
| 1,570,938 | 1/1926 | Butler et al. | 73—292 |

S. CLEMENT SWISHER, Primary Examiner

D. M. YASICH, Assistant Examiner

U.S. Cl. X.R.

73—343